United States Patent
Liu et al.

(10) Patent No.: US 7,948,479 B2
(45) Date of Patent: May 24, 2011

(54) METHOD AND SYSTEM FOR DISTINGUISHING MULTIPLE TOUCH POINTS

(75) Inventors: Yun-Cheng Liu, Banciao (TW); Chin-Kang Chang, Taoyuan (TW); Ching-Chun Chiang, Tao Yuan Shien (TW)

(73) Assignee: Quanta Computer Inc., Tao Yuan Shien (TW)

( * ) Notice: Subject to any disclaimer, the term of this patent is extended or adjusted under 35 U.S.C. 154(b) by 699 days.

(21) Appl. No.: 12/071,263

(22) Filed: Feb. 19, 2008

(65) Prior Publication Data
US 2009/0066662 A1    Mar. 12, 2009

(30) Foreign Application Priority Data
Sep. 7, 2007  (TW) .............................. 96133403 A

(51) Int. Cl.
*G09G 5/00*  (2006.01)
(52) U.S. Cl. ........ 345/173; 345/156; 345/175; 345/178; 178/18.01
(58) Field of Classification Search .......... 345/173–178, 345/156; 178/18.01–18.09
See application file for complete search history.

(56) References Cited

U.S. PATENT DOCUMENTS

| | | | |
|---|---|---|---|
| 4,703,316 A | | 10/1987 | Sherbeck |
| 5,317,140 A | * | 5/1994 | Dunthorn .................... 250/221 |
| 6,421,042 B1 | * | 7/2002 | Omura et al. ............... 345/157 |
| 2005/0190162 A1 | | 9/2005 | Newton |
| 2006/0202974 A1 | * | 9/2006 | Thielman .................... 345/175 |

* cited by examiner

*Primary Examiner* — Quan-Zhen Wang
*Assistant Examiner* — Jennifer T Nguyen
(74) *Attorney, Agent, or Firm* — Thomas, Kayden, Horstemeyer & Risley, LLP

(57) ABSTRACT

The invention provides a system for distinguishing multiple touch points. The system comprises a panel, a first image capturing unit, a second image capturing unit, at least one third image capturing unit, and a processing unit. N touch points are indicated on the panel. A first image and a second image related to the N touch points are captured by the first image capturing unit and the second image capturing unit. At least one third image related to the N touch points is captured by the at least one third image capturing unit. N sets of coordinates corresponding to the N touch points are calculated by the processing unit according to the first image and the second image. And, a set of real coordinates corresponding to the N touch points is determined from the N sets of coordinates according to the at least one third image.

11 Claims, 9 Drawing Sheets

METHOD AND SYSTEM FOR DISTINGUISHING MULTIPLE TOUCH POINTS

BACKGROUND OF THE INVENTION

1. Field of the invention

The invention relates to a touch system and, more particularly, to a system for distinguishing multiple touch points.

2. Description of the prior art

With recent advances in image display technology, touch screens, used to input data in direct contact, have become common display apparatuses and also have been widely applied to various electronic products, such as automated teller machines (ATM), point of sale, tourist guiding systems and industrial control systems.

In general, a conventional touch screen can only detect single touch point at a time no matter it is capacitive-type, resistive-type or camera-type to detect a touch point thereon. Therefore, once a user indicates two or more touch points on the touch screen simultaneously, a detection error will occur.

Accordingly, the main scope of the invention is to provide a method and system for distinguishing multiple touch points, so as to solve the aforesaid problems.

SUMMARY OF THE INVENTION

The invention provides a system and method for distinguishing multiple touch points. The system for distinguishing multiple touch points comprises a panel, a first image capturing unit, a second image capturing unit, at least one third image capturing unit, and a processing unit. The first image capturing unit is disposed on a first position at an outer edge of the panel. The second image capturing unit is disposed on a second position, which is opposite to the first position, at the outer edge of the panel. The third image capturing unit is disposed at the outer edge of the panel and between the first image capturing unit and the second image capturing unit.

In this embodiment, when a user indicates N touch points on the panel (N is a positive integer larger than one), the first image capturing unit captures a first image related to the N touch points, the second image capturing unit captures a second image related to the N touch points, and the third image capturing unit captures at least one third image related to the N touch points. Afterward, the processing unit calculates N sets of coordinates corresponding to the N touch points according to the captured first and second images, and then determines one set of real coordinates corresponding to the N touch points from the N sets of coordinates according to the captured third image.

Therefore, according to the aforesaid system and method for distinguishing multiple touch points, the invention can achieve the objective of detecting multiple touch points at the same time.

The advantage and spirit of the invention may be understood by the following recitations together with the appended drawings.

BRIEF DESCRIPTION OF THE APPENDED DRAWINGS

Figure 2A:
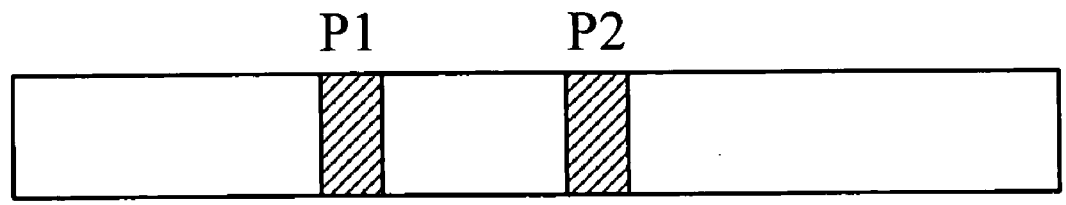
FIG. 2(A) is a schematic diagram illustrating a first image related to touch points captured by a first image capturing unit.
Figure 2B:
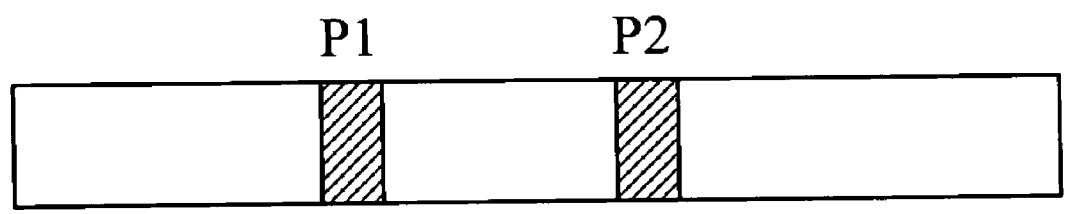

FIG. 2(B) a schematic diagram illustrating a second image related to touch points captured by a second image capturing unit.

Figure 3:
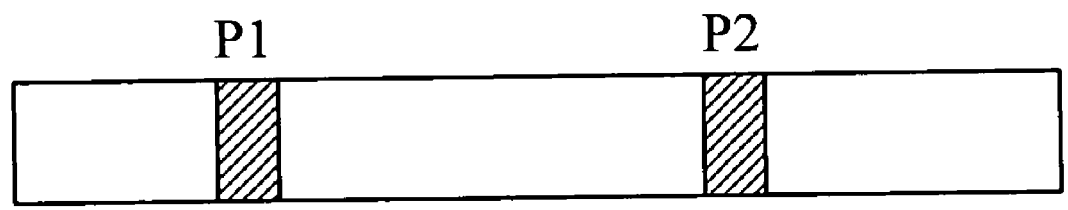

FIG. 3 is a schematic diagram illustrating a third image related to touch points captured by a third image capturing unit.

Figure 4:
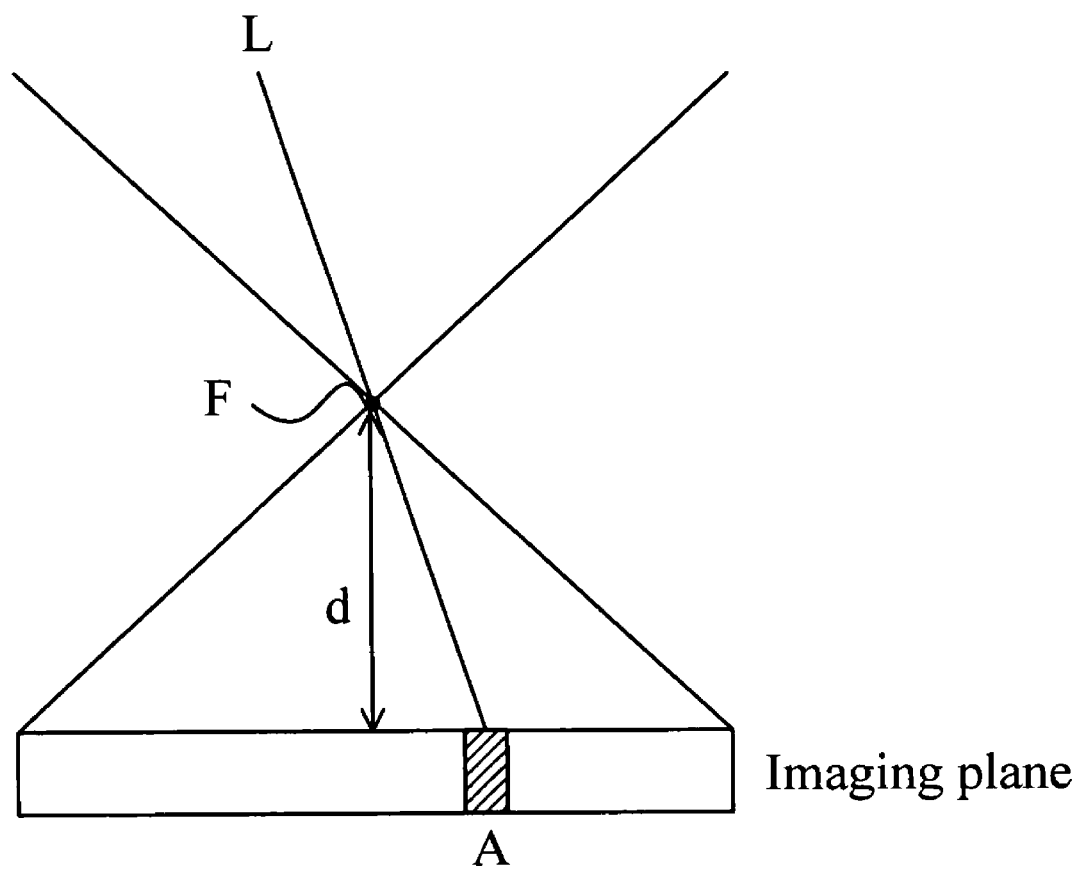

FIG. 4 is a schematic diagram illustrating a linear equation corresponding to two touch points calculated by a processing unit according to a first image and a focus of a first image capturing unit.

Figure 5:
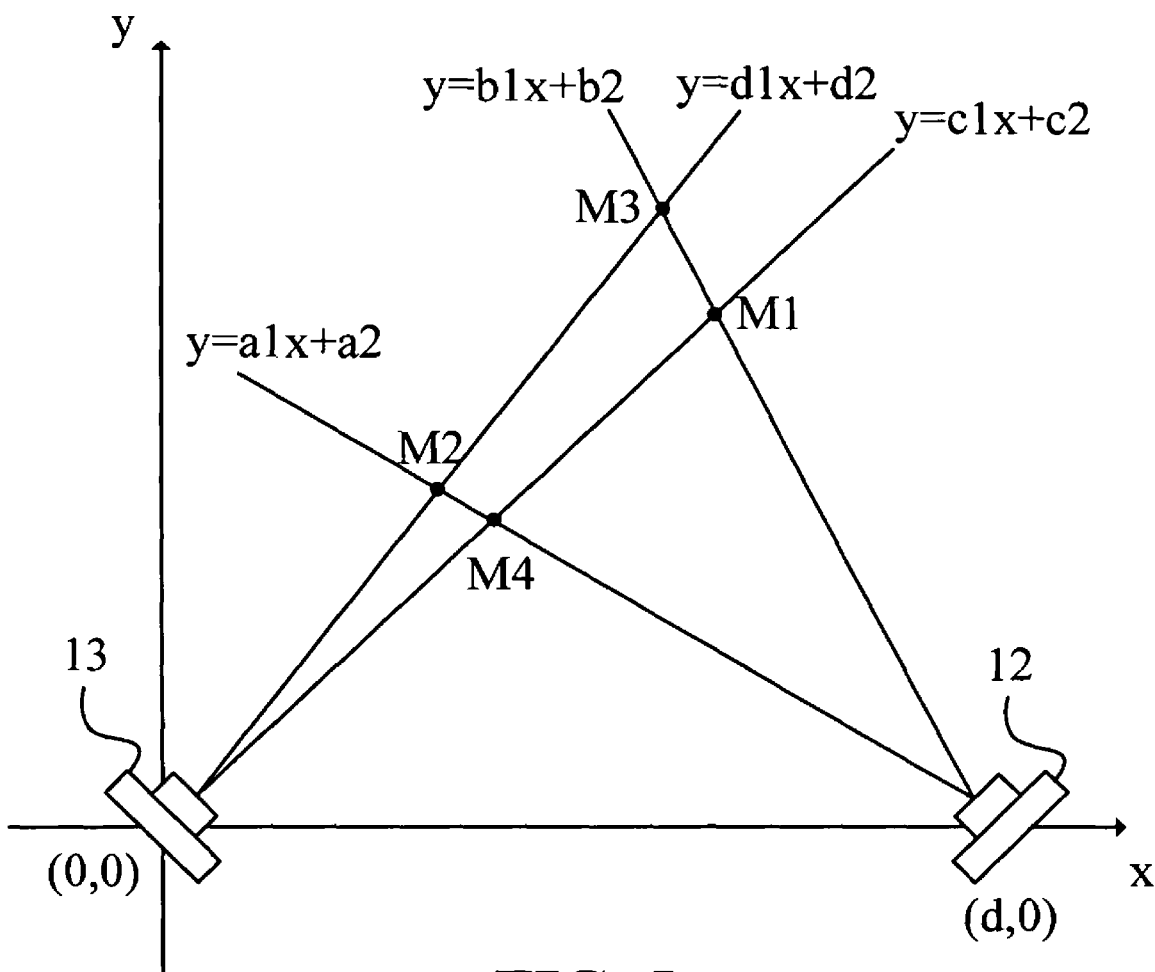

FIG. 5 is a schematic diagram illustrating two sets of coordinates corresponding to two touch points calculated by a processing unit.

Figure 6:
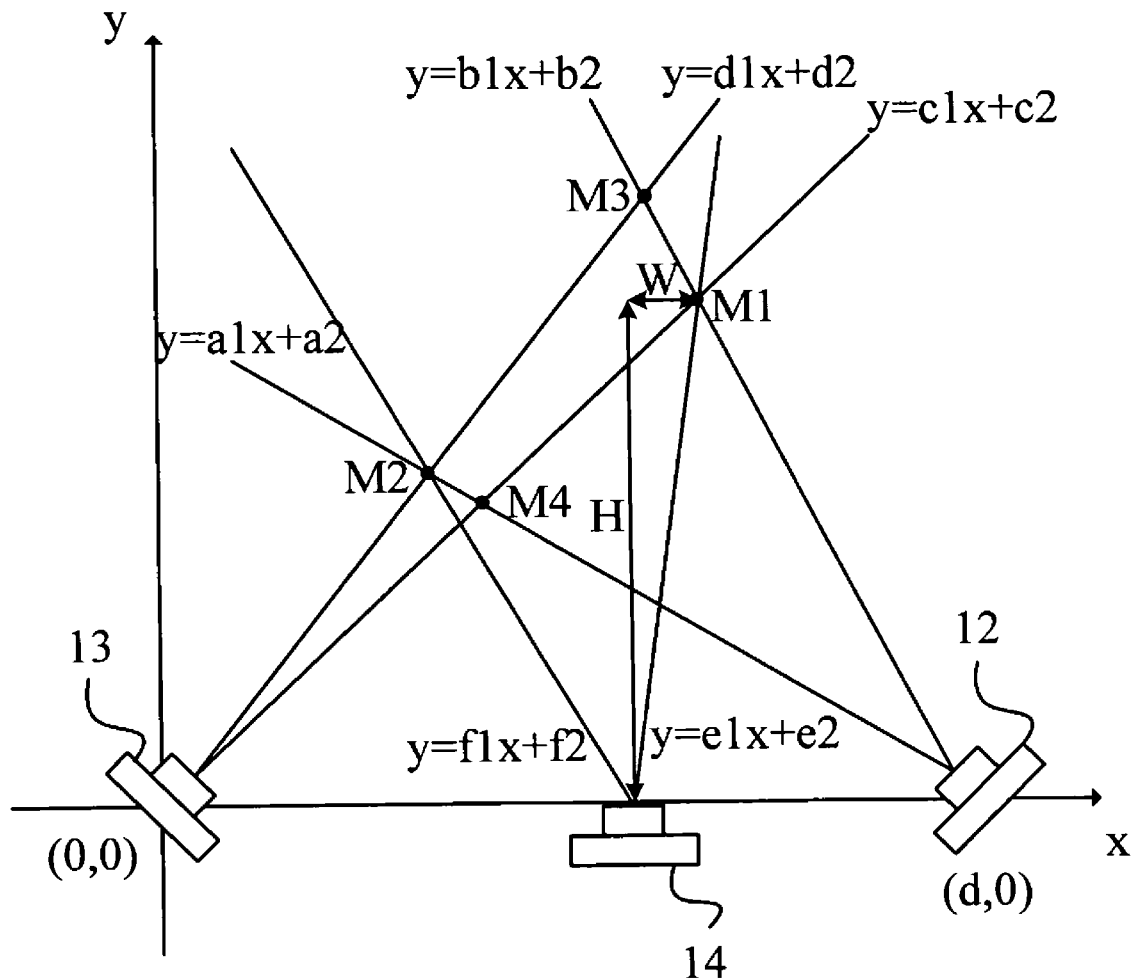

FIG. 6 is a schematic diagram illustrating a set of real coordinates corresponding to two touch points determined by a processing unit from two sets of coordinates shown in FIG. 5.

Figure 7:
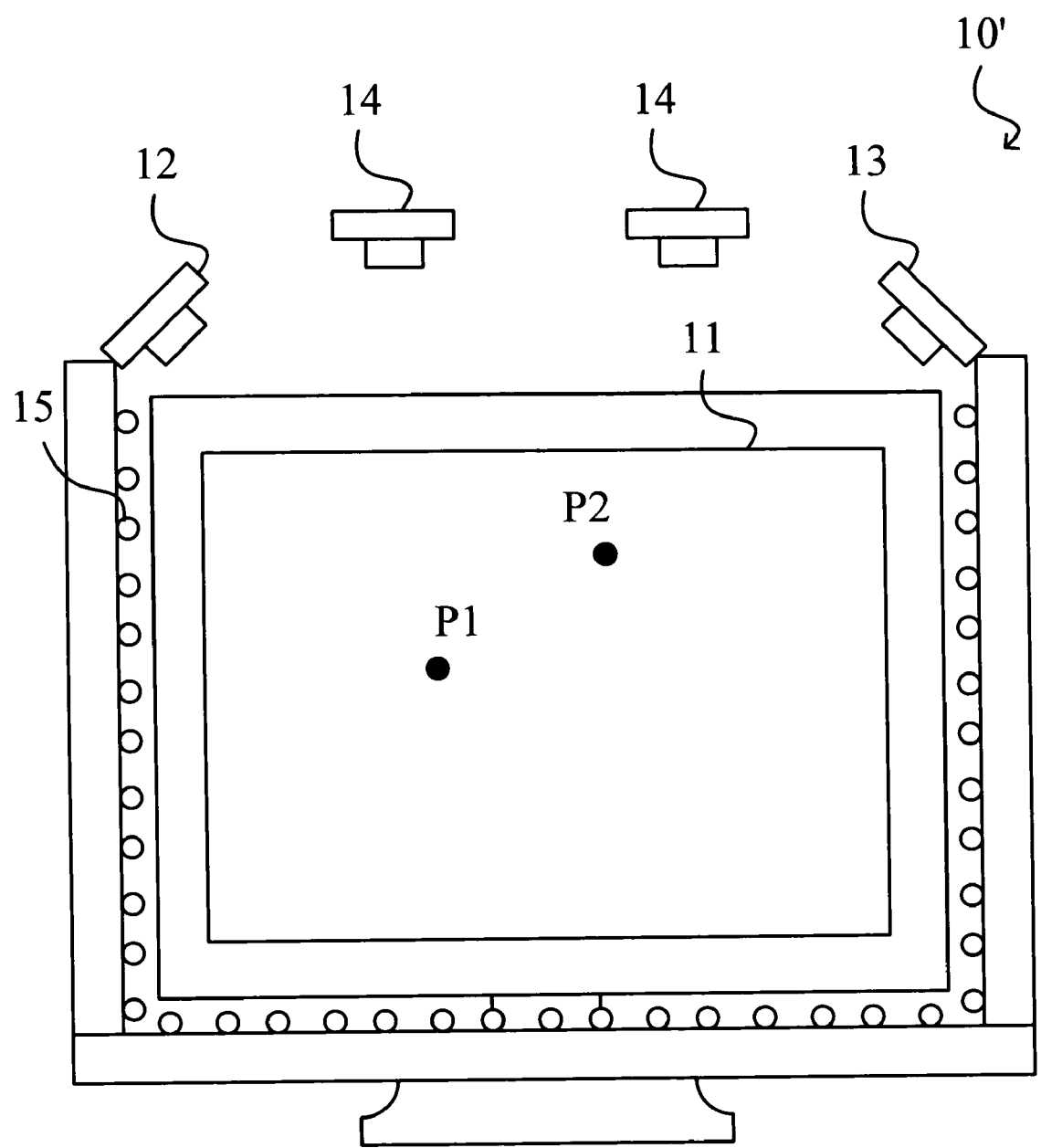

FIG. 7 is a schematic diagram illustrating a system for distinguishing multiple touch points which comprises two third image capturing units.

Figure 8:
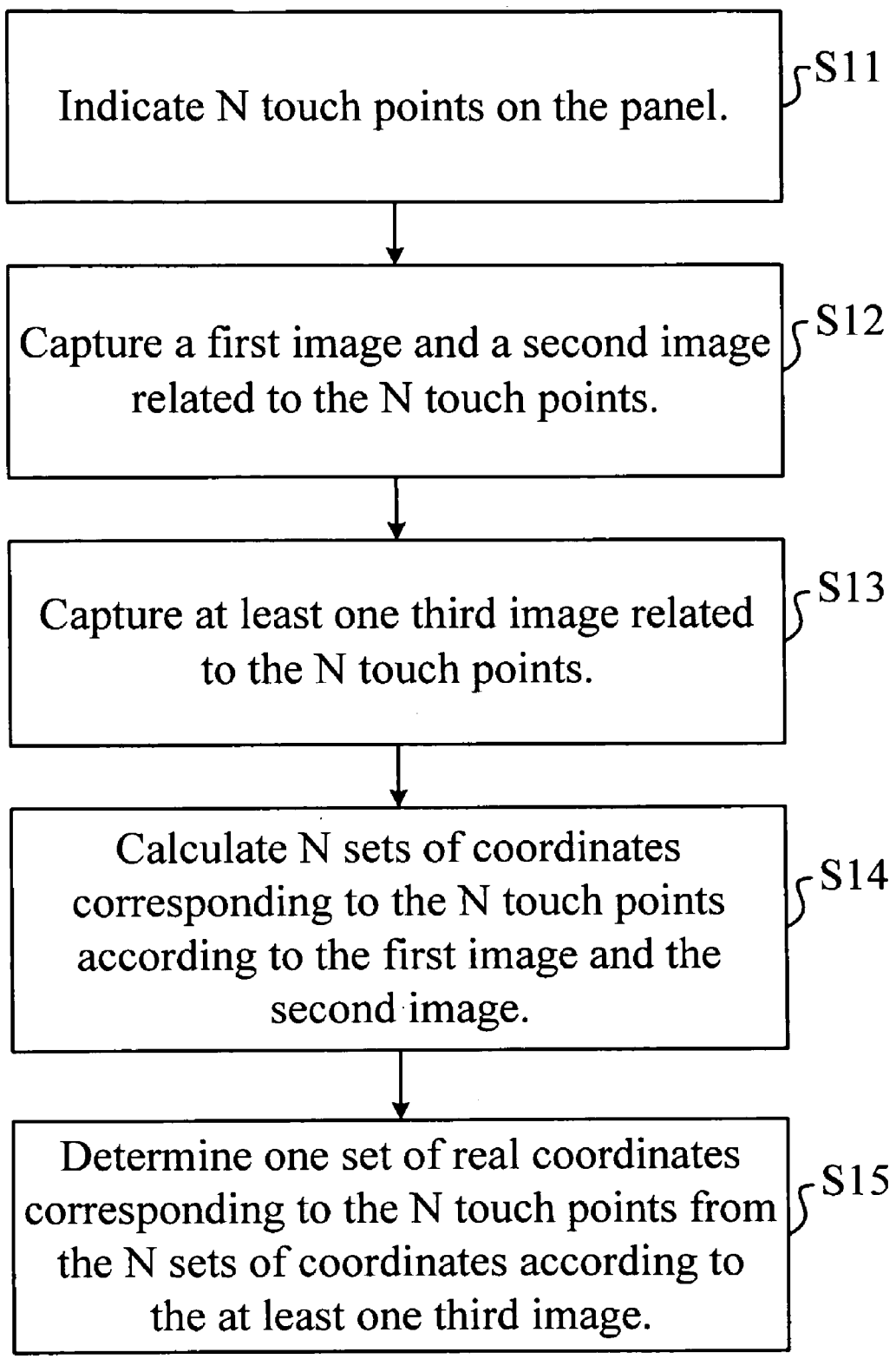

FIG. 8 is a flow chart illustrating a method for distinguishing multiple touch points according to an embodiment of the invention.

Figure 9:
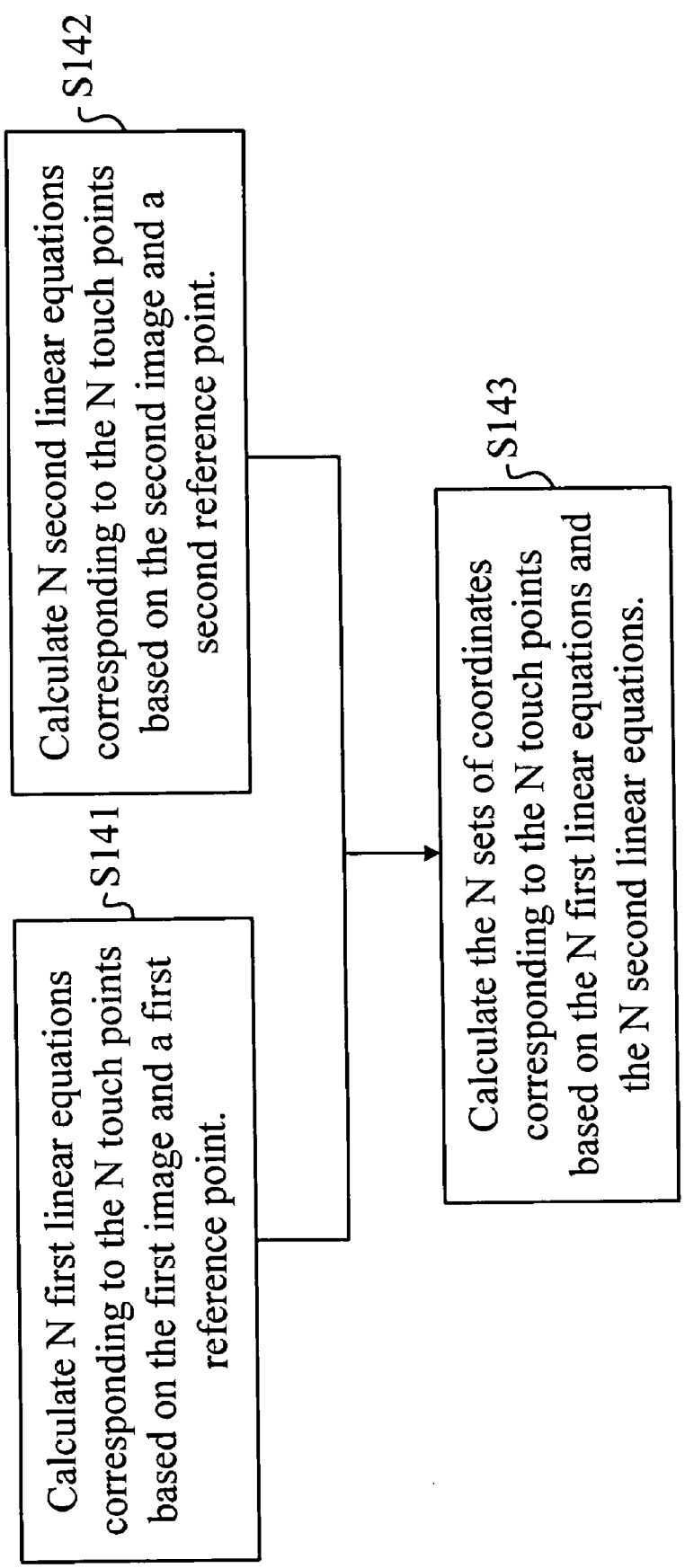

FIG. 9 is a flow chart illustrating step S14 shown in FIG. 8 in detail.

Figure 10:
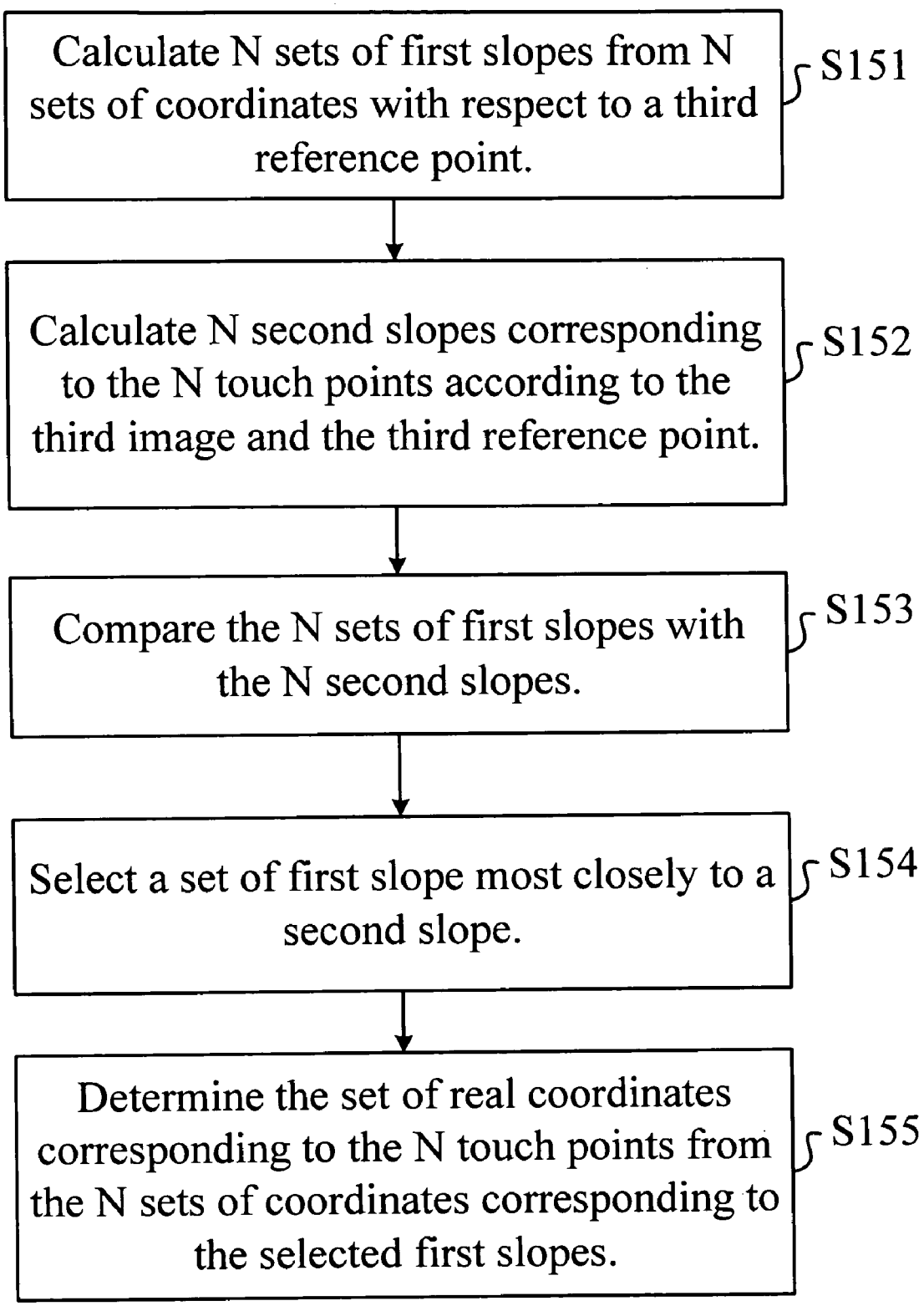

FIG. 10 is flow chart illustrating step S15 shown in FIG. 8 in detail.

DETAILED DESCRIPTION OF THE INVENTION

Figure 1:
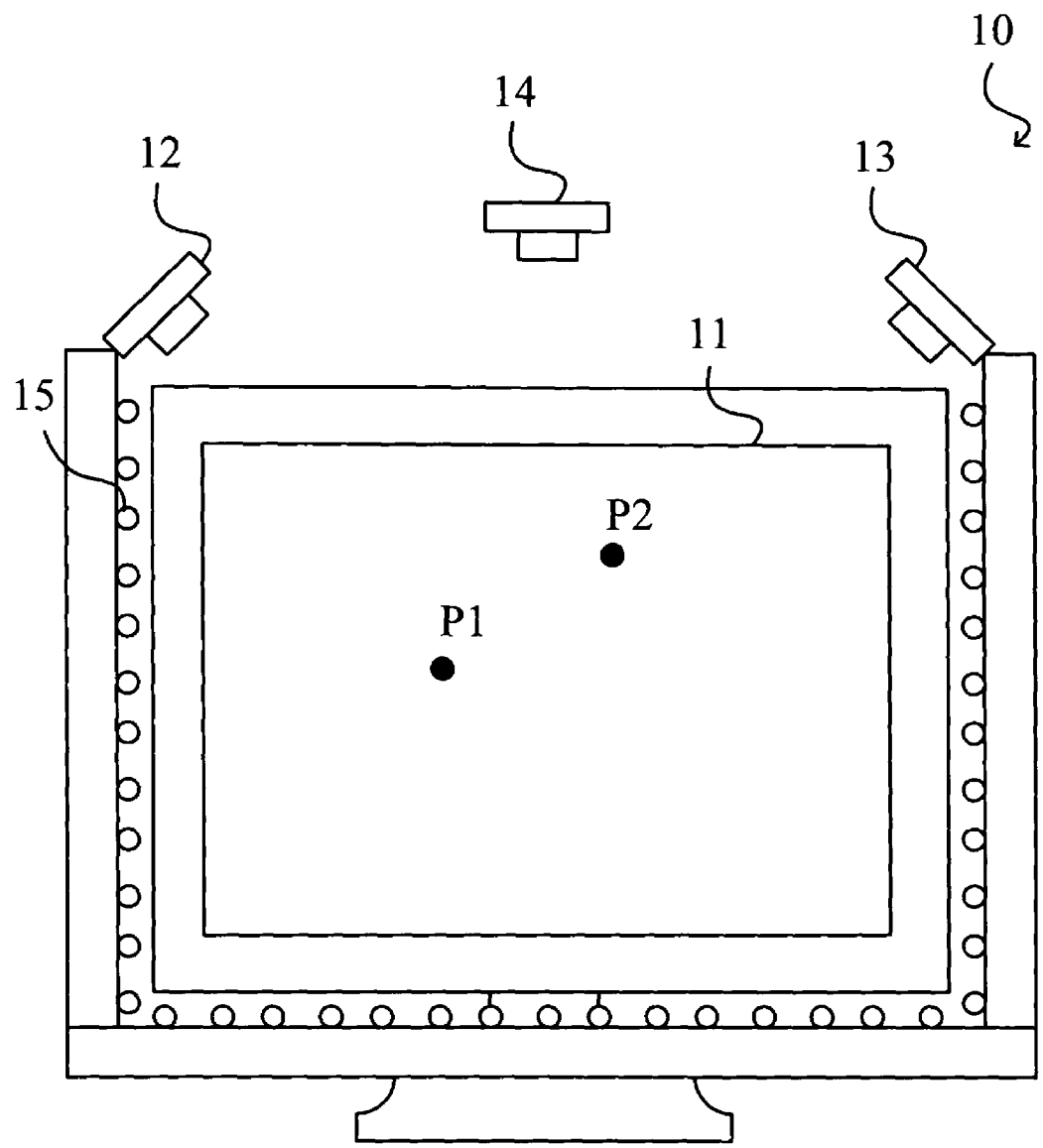
FIG. 1 is a schematic diagram illustrating a system for distinguishing multiple touch points according to an embodiment of the invention.

Please refer to FIG. 1. FIG. 1 is a schematic diagram illustrating a system 10 for distinguishing multiple touch points according to an embodiment of the invention. As shown in FIG. 1, the system 10 comprises a panel 11, a first image capturing unit 12, a second image capturing unit 13, a third image capturing unit 14 and a processing unit (not shown). N touch points are indicated on the panel 11, and N is a positive integer larger than one. That is to say, there are two or more touch points on the panel 11.

The first image capturing unit 12 is disposed on a first position at an outer edge of the panel 11 and used for capturing a first image related to the N touch points. The second image capturing unit 13 is disposed on a second position, which is opposite to the first position, at the outer edge of the panel 11 and used for capturing a second image related to the N touch points. The third image capturing unit 14 is also disposed at the outer edge of the panel 11 and between the first image capturing unit 12 and the second image capturing unit 13. The third image capturing unit 14 is used for capturing a third image related to the N touch points. According to the first and second images, the processing unit is used for calculating N sets of coordinates corresponding to the N touch points and for determining one set of real coordinates corresponding to the N touch points from the N sets of coordinates according to the third image. Each of the N sets of coordinates comprises N coordinates.

In practical applications, the first image capturing unit 12 and the second image capturing unit 13 are respectively disposed at a left upper corner and a right upper corner of the panel 11, and the third image capturing unit 14 is disposed at an upper center of the panel 11. The first image capturing unit 12, the second image capturing unit 13 and the third image capturing unit 14 can be infrared video cameras. The system 10 can further comprise a plurality of light-emitting units 15. The light-emitting units 15 are disposed around the panel 11, and a part of light emitted from the light-emitting units 15 is sheltered by the N tough points. Each of the light-emitting units 15 is an infrared light-emitting diode.

Furthermore, the aforesaid processing unit calculates N first linear equations corresponding to the N touch points based on the first image and a focus (as point F shown in FIG. 4) of the first image capturing unit 12. At the same time, the processing unit calculates N second linear equations corresponding to the N touch points based on the second image and a focus of the second image capturing unit 13. Then, the processing unit calculates N sets of coordinates corresponding to the N touch points based on the N first linear equations and the N second linear equations.

Afterward, the processing unit calculates N sets of first slopes from N sets of coordinates with respect to the third image capturing unit 14 and calculates N second slopes corresponding to the N touch points according to the third image and a focus of the third image capturing unit 14.

Finally, the processing unit compares the N second slopes with the N sets of first slopes to select a set of first slopes nearest the N second slopes from the N sets of first slopes, and then determines a set of real coordinates corresponding to the N touch points from the N sets of coordinates corresponding to the selected first slopes.

For instance, if a user utilizes two fingers to indicate two touch points P1 and P2 on the panel 11 of the system 10 shown in FIG. 1, the first image capturing unit 12 and the second image capturing unit 13 respectively capture a first image (as shown in FIG. 2(A)) and a second image (as shown in FIG. 2(B)) related to the two touch points P1 and P2.

Assume that the system 10 has only one third image capturing unit 14 disposed between the first image capturing unit 12 and the second image capturing unit 13. Please refer to FIG. 3. FIG. 3 is a schematic diagram illustrating a third image related to two touch points P1 and P2 captured by a third image capturing unit 14.

Please refer to FIG. 4. FIG. 4 is a schematic diagram illustrating a linear equation corresponding to two touch points calculated by a processing unit according to a first image and a focus of the first image capturing unit 12. As shown in FIG. 4, assume that a touch point A is indicated on an imaging plane, the invention can obtain a linear equation L related to the touch point A through mathematical calculations because a focus F of an image capturing unit and a focal length d are known.

In this embodiment, there are two touch points P1 and P2. Therefore, the processing unit calculates two first linear equations "$y=a1x+a2$" and "$y=b1x+b2$" respectively corresponding to the two touch points P1 and P2 according to a first image and the first image capturing unit 12. Similarly, the processing unit obtains two second linear equations "$y=d1x+d2$" and "$y=c1x+c2$" respectively corresponding to the two touch points P1 and P2 according to a second image and the second image capturing unit 13. Then, the processing unit respectively calculates two sets of coordinates (four coordinates in total) corresponding to the two touch points P1 and P2 according to the two first equations ($y=a1x+a2$ and $y=b1x+b2$) and the two second equations ($y=d1x+d2$ and $y=c1x+c2$). As shown in FIG. 5, one set of coordinates is represented by M1 and M2, and the other set is represented by M3 and M4.

Please refer to FIG. 6. Afterward, the processing unit respectively calculates first slopes m1, m2, m3 and m4 from the coordinates M1, M2, M3 and M4 with respect to the third image capturing unit 14. Take the coordinate M1 as a example, if a horizontal distance from the coordinate M1 with respect to the third image capturing unit 14 is W, and a vertical distance is H, the first slope m1 from the coordinate M1 with respect to the third image capturing unit 14 is H/W. Similarly, the first slopes m2, m3 and m4 can be obtained. On the other hand, the processing unit calculates two second slopes, e1 and f1, corresponding to the two touch points P1 and P2 according to a third image and a focus of the third image capturing unit 14 and linear equations "$y=e1x+e2$" and "$y=f1x+f2$" thereof shown in FIG. 6.

Finally, the processing unit compares the second slopes e1 and f1 with the first slopes m1, m2, m3 and m4 to select a set of first slopes m1 and m2 nearest (nearest in the slope) the set of second slopes e1 and f1 from the sets of first slopes m1, m2, m3 and m4, and then determines a set of real coordinates M1 and M2 corresponding to the two touch points P1 and P2 from the sets of coordinates M1, M2, M3 and M4.

In order to avoid the slopes being misjudged between positive and negative infinities, the invention can calculate reciprocals of the slopes m1, m2, m3, m4, e1 and f1 in advance, and then perform the aforesaid comparison process to determine a set of real coordinates corresponding to the two touch points P1 and P2. Besides, lots of well-known methods can be applied to compare the reciprocals, such as absolute differences method or least squares method.

Besides utilizing slopes, other representative parameters can also be selected for judging the two touch points P1 and P2 according to different hardware structures. The invention can select different judging methods according to different requirements.

According to another embodiment of the invention, the invention may install several third image capturing units 14 between the first image capturing unit 12 and the second image capturing unit 13. As shown in FIG. 7, a system 10' for distinguishing multiple touch points comprises two third image capturing units 14. The principle of the system 10' is the same as the system 10, and the related description will not be mentioned again here.

Please refer to FIG. 8. FIG. 8 is a flow chart illustrating a method for distinguishing multiple touch points according to an embodiment of the invention. The method for distinguishing multiple touch points of the invention is applied to the system 10 shown in FIG. 1. As shown in FIG. 8, first of all, step S11 is performed to indicate N touch points on the panel 11. Step S12 is then performed to capture a first image (as shown in FIG. 2(A)) and a second image (as shown in FIG. 2(B)) related to the N touch points. Then, step S13 is performed to capture at least one third image (as shown in FIG. 3) related to the N touch points. Afterward, step S14 is performed to calculate N sets of coordinates corresponding to the N touch points according to the first image and the second image. Finally, step S15 is performed to determine one set of real coordinates corresponding to the N touch points from the N sets of coordinates according to the at least one third image.

As shown in FIG. 9, the step S14 of the method can further comprises comprise sub-steps S141.about.S143. Step S141 is performed to calculate N first linear equations corresponding to the N touch points based on the first image and a first reference point (namely the focus of the first image capturing unit 12). Step S142 is then performed to calculate N second linear equations corresponding to the N touch points based on the second image and a second reference point (namely the focus of the second image capturing unit 13). Afterward, step S143 is performed to calculate the N sets of coordinates corresponding to the N touch points based on the N first linear equations and the N second linear equations.

As shown in FIG. 10, the step S15 of the method can further comprises sub-steps S151~S155. Step 151 is performed to calculate N sets of first slopes from N sets of coordinates with respect to a third reference point (namely the focus of the third image capturing unit 14). Step S152 is then performed to calculate N second slopes corresponding to the N touch points according to the third image and the third reference point. Then, step S153 is performed to compare the N second slopes with the N sets of first slopes. Afterward, step S154 is performed to select a set of first slope nearest the N second slopes from the N sets of first slopes. Finally, step 155 is performed to determine the set of real coordinates corresponding to the N touch points from the N sets of coordinates corresponding to the selected first slopes.

Compared with the prior art, the system and method for distinguishing multiple touch points according to the invention, the invention can achieve the objective of detecting multiple touch points at the same time to overcome a disadvantage of the conventional touch screen, which cannot distinguish multiple touch points.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A system for distinguishing multiple touch points, comprising:
    a panel, N touch points being indicated on the panel, N being a positive integer larger than one;
    a first image capturing unit, disposed on a first position at an outer edge of the panel, for capturing a first image related to the N touch points;
    a second image capturing unit, disposed on a second position, which is opposite to the first position, at the outer edge of the panel, for capturing a second image related to the N touch points;
    at least one third image capturing unit, disposed at the outer edge of the panel and between the first image capturing unit and the second image capturing unit, for capturing a third image related to the N touch points;
    a processing unit for calculating N sets of coordinates corresponding to the N touch points according to the first image and the second image and for determining one set of real coordinates corresponding to the N touch points from the N sets of coordinates according to the at least one third image;
    wherein the processing unit calculates N sets of first slopes from the N sets of coordinates with respect to the third image capturing unit and calculates N second slopes corresponding to the N touch points according to the third image and a focus of the third image capturing unit;
    wherein the processing unit selects a set of first slopes from the N sets of first slopes according to an algorithm and determines the set of real coordinates corresponding to the N touch points from the selected first slopes; and
    wherein the algorithm calculates reciprocals of the N sets of first slopes and the N second slopes, obtains N values by processing the reciprocals of the N sets of first slopes and the N second slopes through an absolute differences method or a least squares method, and then selects a smallest one among the N values.

2. The system of claim 1, further comprising a plurality of light-emitting units disposed around the panel, and a part of light emitted from the light-emitting units being sheltered by the N touch points.

3. The system of claim 2, wherein each of the light-emitting units is an infrared light-emitting diode.

4. The system of claim 1, wherein each of the N sets of coordinates comprises N coordinates.

5. The system of claim 1, wherein the processing unit calculates N first linear equations corresponding to the N touch points based on the first image and a focus of the first image capturing unit, the processing unit calculates N second linear equations corresponding to the N touch points based on the second image and a focus of the second image capturing unit, and the processing unit calculates the N sets of coordinates corresponding to the N touch points based on the N first linear equations and the N second linear equations.

6. The system of claim 1, wherein the first image capturing unit, the second image capturing unit and the third image capturing unit are infrared video cameras.

7. The system of claim 1, wherein the first image capturing unit and the second image capturing unit are respectively disposed at a left upper corner and a right upper corner of the panel, and the third image capturing unit is disposed at an upper center of the panel.

8. A method for distinguishing multiple touch points, comprising steps of:
    (a) indicating N touch points on a panel, N being a positive integer larger than one;
    (b) capturing a first image and a second image related to the N touch points;
    (c) capturing at least one third image related to the N touch points;
    (d) calculating N sets of coordinates corresponding to the N touch points according to the first image and the second image; and
    (e) determining one set of real coordinates corresponding to the N touch points from the N sets of coordinates according to the at least one third image, wherein the step (e) comprises steps of:
        calculating N sets of first slopes from the N sets of coordinates with respect to a third reference point;
        calculating N second slopes corresponding to the N touch points according to the third image and the third reference point;
        selecting a set of first slopes from the N sets of first slopes according to an algorithm, wherein the algorithm calculates reciprocals of the N sets of first slopes and the N second slopes, obtains N values by processing the reciprocals of the N sets of first slopes and the N second slopes through an absolute difference method or a least squares method, and then selects a smallest one among the N values; and
        determining the set of real coordinates corresponding to the N touch points from the selected first slopes.

9. The method of claim 8, wherein each of the N sets of coordinates comprises N coordinates.

10. The method of claim 8, wherein the step (d) comprises steps of:
    calculating N first linear equations corresponding to the N touch points based on the first image and a first reference point;
    calculating N second linear equations corresponding to the N touch points based on the second image and a second reference point; and
    calculating the N sets of coordinates corresponding to the N touch points based on the N first linear equations and the N second linear equations.

11. A system for distinguishing multiple touch points, comprising:
    a panel, N touch points being indicated on the panel, N being a positive integer larger than one;

a first image capturing unit, disposed on a first position at an outer edge of the panel, for capturing a first image related to the N touch points;

a second image capturing unit, disposed on a second position, which is opposite to the first position, at the outer edge of the panel, for capturing a second image related to the N touch points;

at least one third image capturing unit, disposed at the outer edge of the panel and between the first image capturing unit and the second image capturing unit, for capturing a third image related to the N touch points; and a processing unit for calculating N sets of coordinates corresponding to the N touch points according to the first image and the second image, calculating slopes of first lines connecting the coordinates of the N sets of coordinates to the third image capturing unit, calculating a set of coordinates corresponding to the N touch points according to the third image, calculating slopes of second lines connecting the coordinates of the set of coordinates to the third image capturing unit and determining one set of real coordinates by comparing the slopes of the first lines and the slopes of the second lines.

* * * * *